United States Patent [19]

Whitcomb

[11] 4,328,025
[45] May 4, 1982

[54] MICRONUTRIENT FERTILIZER

[75] Inventor: Carl E. Whitcomb, Stillwater, Okla.

[73] Assignee: Bd. of Regents for the Okla. Agri. and Mech. Colleges Acting For & On Behalf of Oklahoma State University, Stillwater, Okla.

[21] Appl. No.: 61,842

[22] Filed: Jul. 30, 1979

[51] Int. Cl.³ .................. C05F 11/02; C05F 5/00; C05D 9/02
[52] U.S. Cl. ........................................ 71/23; 71/25; 71/26; 71/27; 71/32; 71/54; 71/61; 71/63; 71/64 SC
[58] Field of Search ............... 71/23, 24, 31, 32, 63, 71/64 F, 64 SC, 61

[56] References Cited

U.S. PATENT DOCUMENTS

| | | | |
|---|---|---|---|
| 2,280,451 | 4/1942 | Riddle | 71/31 X |
| 3,323,898 | 6/1967 | Pierce | 71/64 F |
| 3,357,814 | 12/1967 | Getsinger | 71/31 |
| 3,794,478 | 2/1974 | Dirksen | 71/63 X |
| 4,035,173 | 7/1977 | Hashimoto et al. | 71/28 X |

FOREIGN PATENT DOCUMENTS 5,099,865   8/1975   Japan ..................................... 71/31

OTHER PUBLICATIONS

Bardsley; PCT International Pub. No. WO 79/00261; 5/1979; all pages; 71–63.

*Primary Examiner*—Michael S. Marcus
*Attorney, Agent, or Firm*—Head & Johnson

[57] ABSTRACT

Micronutrient fertilizer consisting of iron, manganese, copper, boron, and zinc in which the manganese-to-iron ratio is 8 to 20%, the copper-to-iron ratio is 5 to 10%, the boron-to-iron ratio is 0.4 to 1.0%, and the zinc-to-iron ratio is 6 to 12%.

20 Claims, No Drawings

MICRONUTRIENT FERTILIZER

BACKGROUND OF THE INVENTION

1. Field of the Invention

This invention relates to micronutrient fertilizers particularly useful in production of container grown nursery stock and greenhouse plants. The invention concerns the discovery of the criticality of the ratios of specific micronutrient fertilizers for most efficient growth of container plants.

2. Description of the Prior Art

The importance of fertilizers in the growth of plants has long been recognized. Chemical fertilizers may be generally divided into two basic classes; that is, the primary fertilizers and the secondary fertilizers which are commonly referred to as trace elements or micronutrients. The primary chemical fertilizers are nitrogen, phosphorus and potassium. Most fertilizers sold commercially today include primarily these three elements. In many agricultural applications for field-grown crops these are the only chemical fertilizers added, it being expected that the small quantities of trace minerals or micronutrients will be available from the soil. Sometimes in addition to these three basic chemical fertilizers calcium is also routinely applied.

The fertilizer requirement for plants grown in containers and greenhouse plants presents a different requirement as far as proper fertilization is concerned. In many parts of the United States, and the world as a whole, container culture of nursery and greenhouse plants is expanding rapidly. In order to achieve proper moisture drainage, and therefore oxygen for root development and nutrient absorption, a wide assortment of organic and inorganic materials are used as components of the container growing medium. This container growing medium takes the place of soil in which garden-grown or field-grown plants are produced. In the proper fertilization of container-grown plants the prior art has taught the importance of micronutrients. It has been known that growth of plants is substantially enhanced by the inclusion of micronutrients in the growing medium, including iron, manganese, copper, zinc, boron, and molybdenum. As an example, reference may be made to U.S. Pat. Nos. 3,010,818 and 3,353,949. These are representative of a number of other prior issued patents and publications which have indicated the desirability of including micronutrients in plant growing medium. The present invention is concerned with the discovery of the importance and criticality of the ratios of the micronutrients in the growing medium.

It is therefore an object of this invention to provide an improved micronutrient fertilizer. More particularly, an object is to provide a fertilizer composition supplying trace minerals in proper ratios to produce improved plant growth. Still more particularly, an object of this invention is to provide a plant growing medium including trace minerals in proper relationships for improved plant growth.

These general objects as well as other and more specific objects of the invention will be fulfilled in the following description and claims.

SUMMARY OF THE INVENTION

This invention is to a fertilizer composition for supplying micronutrients or trace minerals to a plant growing medium, particularly of the type required for container-grown or greenhouse-grown plants. The micronutrient fertilizer consists of iron, manganese, copper, boron, and zinc, and preferably, also molybdenum.

These basic elements are supplied in a critical ratio so that in the composition the manganese-to-iron ratio is about 8 to 20%, the copper-to-iron ratio is about 5 to 10%, the boron-to-iron ratio is about 0.4 to 1.0%, the zinc-to-iron ratio is about 6 to 12%, and the molybdenum-to-iron ratio is 0.02 to 0.07%. The elements may be added in the form of any water-soluble compound, preferably a water-soluble salt. The fertilizer composition may be economically formulated by the combination of iron sulfate, manganese sulfate, copper sulfate, zinc sulfate, sodium borate, and sodium molybdate.

The invention includes, as another embodiment, a medium for growing plants in containers, including a base material, a base fertilizer, and micronutrient fertilizer comprising iron, manganese, zinc, copper, and boron wherein these elements are in the following ratios to iron: Manganese 8 to 20%, copper 5 to 10%, boron 0.4 to 1.0%, zinc 6 to 12%, and molybdenum 0.02 to 0.07.

DETAILED DESCRIPTION OF THE PREFERRED EMBODIMENT

In order to more precisely control the environment in which plants are grown, more and more nurseries are employing container growing techniques. By confining the plant growing medium to a container rather than growing the plants under field conditions, the nurserymen can more precisely control the environment to achieve a more rapid and higher quality growth and a higher percentage of success in the propagation and growth of young plants. The first requirement of the growing medium is a base material which replaces the usual soil in which field-grown plants are grown. This base material is chosen from a wide assortment of organic and inorganic materials as components for the container-growing medium. Peat, wood chips, sawdust, ground hardwood, softwood tree bark, expanded vermiculite, expanded perlite, sand, rice hulls, pecan hulls, bagasse, styrofoam beads, fly ash, shale, and other coarse-textured materials may be used in varying proportions to formulate an economical container growing medium with good water holding and drainage characteristics. These materials are sometimes utilized alone or in combination with various ratios of soil. The proper physical construction of the base growing medium affords good water-holding capabilities as well as drainage, insuring proper oxygen delivery to the plant root structure.

The materials contained in the typical plant-growing base medium contain few, if any, nutrients. It is therefore necessary to supply all of the required plant growth nutrients through supplemental means. The first requirement is that of base fertilizers, that is, nitrogen, phosphorus, and potassium. These are the materials most commonly employed in enhancing the growth of plants in soil and must first be supplied to a plant growing medium for container propagation of plants. This base fertilizer may also include calcium, magnesium, and sulfur. The particular ratio of nitrogen, phosphorus and potassium varies considerably according to the nature of the plant being grown and much material has been written on the desired ratios and concentrations of base fertilizers. These base fertilizer requirements may be applied frequently to the plant growing medium or supplied in slow-release form. The basic fertilizers have a fairly high solubility and unless provided in a slow-release composition, will rapidly leach from the growing medium.

In recent years the importance of trace minerals or micronutrients in addition to the base fertilizers has been recognized. Micronutrient fertilizers typically exist in soil, and once established in growing soil, are usually found sufficient for an extended period since they are not readily leached from the soil and assimilation by growing plants is not rapid. However, in a growing medium of the type described for container plants, it is highly important that the micronutrients be supplied to achieve maximum plant growth rate. Micronutrients are normally available as salts which are not highly soluble, and therefore, once added to a growing media, they do not rapidly leach away. For this reason, in most container growing medium the micronutrient fertilizer required for a time sufficient to mature the plant, or at least for a time of 18 months or longer, may be supplied initially, and unlike the base fertilizers, does not have to be periodically replenished.

The most important micronutrients or trace minerals are iron, manganese, copper, boron, zinc, and molybdenum. The first five are most critical. Micronutrients are unique in that the latitude between deficiency and toxicity is very narrow. This means that it is not advisable to apply small amounts of micronutrients frequently as is done with base fertilizers. As previously stated, micronutrients do not rapidly leach from container growing medium and may be most efficiently applied to the growing medium during the original mixing procedure of the various organic and inorganic components. Using the invention herein, micronutrients will preferably be supplied in optimum quantity for superior crop growth for a period of at least 18 months. A second application may be made after 18 months if the plant has not been repotted into a larger container, which should contain new growing medium with the proper micronutrient fertilizer addition.

While others have recognized the necessity for the six basic micronutrients mentioned above, it has been discovered that the ratios of the micronutrients are highly critical to maximum plant growth rate. Computer analysis of data obtained from a large $3^5$ factorial experiment was used to vertify the invention by plotting the response surfaces which indicate plant growth response to specific micronutrient elements and combination of elements. A quadratic response surface with three levels each or iron, manganese, and copper shows that when 174.1 g iron per cubic meter (g/m$^3$) was used in combination with 11 g/m$^3$ copper and 27.2 g/m$^3$ manganese, 16.4 g/m$^3$ zinc and 1.04 g/m$^3$ boron, greatest top weight of *Pyracantha coccinea* was obtained.

The quadratic response surface with three levels each of copper, boron and iron shows that when 11.0 g/m$^3$ copper was used in combination with 1.07 g/m$^3$ boron and 174.1 g/m$^3$ iron and 27.2 g/m$^3$ manganese and 16.4 g/m$^3$ zinc, greatest top weight of pyracantha was obtained.

Hinodegari Azalea, *Rhododendron spp. 'Hinodegari'*, responded similarly to pyracantha to the improved proportion or balance of micronutrients.

Based on the observation and computer analysis of response surfaces, tests vertified that a micronutrient fertilizer containing about 16.4% iron, 3.0% manganese, 1.5% zinc, 1.21% copper, 0.123 boron, and 0.007% molybdenum compounded of ferrous sulfate, manganese sulfate, copper sulfate, sodium borate, and sodium molybdate was ideal for these plants. In this composition the active elements are in approximately the following percentages: Iron, 74%; manganese, 14%; zinc, 7%; copper, 5%; boron, 0.05%; and molybdenum, 003%. Tests compared this micronutrient fertilizer composition with other micronutrient fertilizer products commercially available, and this composition produced superior results. Primarily, and of utmost significance, is that using a micronutrient fertilizer having the above-prescribed ratio of components requires substantially reduced amounts to obtain equal or superior growth rates compared to the most popular micronutrient fertilizers presently commercially available. Whereas some commercially available micronutrients prescribe from 4 to 6 pounds per cubic yard, it has been demonstrated that the total micronutrient requirement of the plant growing medium using the composition above-described, may be obtained utilizing only 1.5 pounds of the micronutrients per cubic yard of growing medium.

As previously indicated, the most important concept of this invention is the criticality of the ratios of the elements. These are preferably expressed as a ratio of the iron, that is, the ratios of the other elements making up the composition vary in relationship to the quantity of iron in the composition. The preferred ratios are set forth in the following table:

| Element | Ratios of Elements (by weight) | | |
|---|---|---|---|
| | Maximum | Average | Minimum |
| Iron | 100 | 100 | 100 |
| Manganese | 20 | 15 | 8 |
| Copper | 10 | 7 | 5 |
| Boron | 1.0 | 0.7 | 0.4 |
| Zinc | 12 | 9 | 6 |
| Molybdenum | 0.07 | 0.04 | 0.02 |

The most critical ratio is iron/manganese and iron/copper. An ideal ratio for iron to manganese is about 5.47 to 1 and for iron to copper, about 13.55 to 1. The next most important ratio is the copper-to-boron ratio which is ideally about 9.84 to 1.

Where iron sulfate is referred to herein it has been determined that ferrous sulfate, particularly in the copperas form is superior to other types of iron sulfates because its solubility is more compatible with the solubility of the other sulfates used in the fertilizer compositions.

The micronutrient compositions as described herein are preferably applied in the form of solids, which may be combined with solid base fertilizers or with complete mediums for growing plants in containers.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A micronutrient fertilizer comprised of iron, manganese, copper, boron, and zinc wherein the manganese-to-iron ratio is 8% to 20%, the copper-to-iron ratio is 5% to 10%, boron-to-iron ratio is about 0.4% to 1.0%, and the zinc-to-iron ratio is about 6% to 12%.

2. A micronutrient fertilizer according to claim 1 including molybdenum in a ratio to iron of about 0.02 to 0.07%.

3. A micronutrient fertilizer according to claim 1 in which the elements are in the form of water-soluble salts.

4. A micronutrient fertilizer according to claim 1 in which each of the elements Fe, Mn, Cu and Zn is in the form of a compound of sulfur, and the boron is in the form of sodium borate.

5. A micronutrient fertilizer according to claim 1 in which the micronutrients are present as salts which do not rapidly leach away when applied.

6. A micronutrient fertilizer according to claim 1 in which the components are iron sulfate, manganese sulfate, copper sulfate, zinc sulfate, and sodium borate in amounts of about 16.4% iron, about 3.0% manganese, about 1.5% zinc, about 1.21% copper, and about 0.123% boron.

7. A micronutrient fertilizer according to claim 6 including sodium molybdate in an amount of about 0.007% molybdenum.

8. A micronutrient fertilizer according to claim 1 comprised of about 74% iron, 14% manganese, 7% zinc, 5% copper, and 0.5% boron, these elements being in the form of water-soluble compounds.

9. A micronutrient fertilizer according to claim 7 including about 0.03% molybdenum in the form of a water-soluble compound.

10. A micronutrient fertilizer comprising iron, manganese, zinc, copper and boron in which the iron-to-manganese ratio is about 5.47; the iron-to-copper ratio is about 13.55; and the copper-to-boron ratio is about 9.84.

11. A composition for growing plants in containers, comprising:
a base soil-like growing medium;
base fertilizer including nitrogen, phosphorous, potassium, calcium, magnesium, and sulfur; and
micronutrient fertilizer mixed with the growing medium, the micronutrient fertilizer compounded of iron, manganese, copper, boron, and zinc in water-soluble forms, and in which the manganese-to-iron ratio is in the range of about 8 to 20%, the copper-to-iron ratio is in the range of about 5 to 10%, the boron-to-iron ratio is in the range of about 0.4 to 1.0%, the zinc-to-iron ratio is in the range of about 6 to 12%, and wherein the micronutrient fertilizer is mixed with the growing medium at a rate of about 1.5 lbs. per cubic yard.

12. A composition for growing plants according to claim 11 wherein the micronutrient fertilizer includes molybdenum in a ratio to iron of about 0.02 to 0.07%.

13. A medium for growing plants in containers, comprising:
a base material selected from peat, wood chips, sawdust, ground hardwood, softwood tree bark, expanded vermiculite, expanded perlite, sand, rice hulls, pecan hulls, bagasse, styrofoam beads, fly ash, soil, shale, and mixtures thereof;
base fertilizer comprising nitrogen, phosphorus potassium, calcium, magnesium, and sulfur; and
micronutrient fertilizer comprising iron, manganese, zinc, copper, and boron and wherein these elements are in the following ratios to iron:

| Manganese | 8 to 20% |
|---|---|
| Copper | 5 to 10% |
| Boron | .4 to 1.0%, and |
| Zinc | 6 to 12%. |

14. A medium for growing plants according to claim 13 wherein the micronutrient fertilizer includes molybdenum in the following ratio to iron: 0.02% to 0.07%.

15. A medium for growing plants in containers according to claim 13 wherein the said micronutrient fertilizer is mixed with said base material at about 1.5 pounds per cubic yard of base material.

16. A method of growing plants in containers which produces superior plants and hastens their growth, comprising
mixing a soil-like medium with basic fertilizer supplying nitrogen, phosphorus, potassium, calcium, magnesium and sulfur;
mixing said medium at a rate of about 1.5 lbs. per cubic yard of said medium with micronutrient fertilizer, said micronutrient fertilizer supplying iron, manganese in a manganese-to-iron ratio of about 8 to 20%, copper in a copper-to-iron ratio of about 5 to 10%, boron in a boron-to-iron ratio of about 0.4 to 1.0%, zinc in a zinc-to-iron ratio of about 6 to 12%; and
growing the plants in containers filled with the resultant mixture for a period of up to 18 months.

17. The method of claim 16 wherein said mixing step includes using molybdenum in said micronutrient fertilizer in a molybdenum-to-iron ratio of about 0.02 to 0.07%.

18. A method of enhancing the growth of container plants in a basic soil-like growing medium,
comprising adding to the soil medium about once each 18 months a micronutrient fertilizer, at a rate of about 1.5 lbs. per cubic yard of said medium, said micronutrient fertilizer supplying iron, manganese in a manganese-to-iron ratio of about 8 to 20%, copper in a copper-to-iron ratio of about 5 to 10%, boron in a boron-to-iron ratio of about 0.4 to 1.0%, zinc in a zinc-to-iron ratio of about 6 to 12%, and
growing plants in containers filled with the resultant mixture for a period of up to 18 months.

19. The method of claim 18 wherein said adding step comprises adding a molybdenum compound supplying molybdenum at a molybdenum-to-iron ratio of about 0.02% to 0.07%.

20. A composition for growing Hinodegiri azaleas and pyracantha in containers, comprising:
a base soil-like growing medium;
base fertilizer including nitrogen, phosphorus, potassium, calcium, magnesium, and sulfur; and
miocronutrient fertilizer mixed with the growing medium, the micronutrient fertilizer compounded of iron, manganese, copper, boron, and zinc in water-soluble forms, and in which the manganese-to-iron ratio is in the range of about 8 to 20%, the copper-to-iron ratio is in the range of about 5 to 10%, the boron-to-iron ratio is in the range of about 0.4 to 1.0%, the zinc-to-iron ratio is in the range of about 6 to 12%, and wherein the micronutrient fertilizer is mixed with the growing medium at a rate of about 1.5 lbs. per cubic yard.

* * * * *